UNITED STATES PATENT OFFICE.

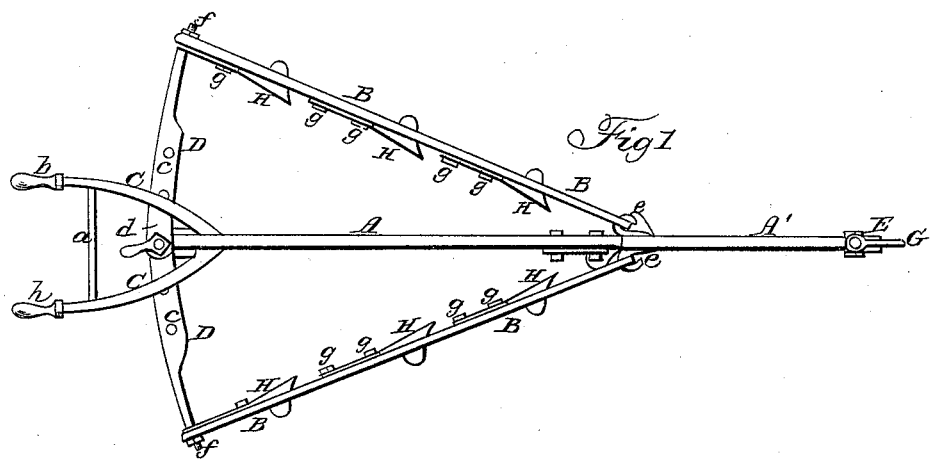
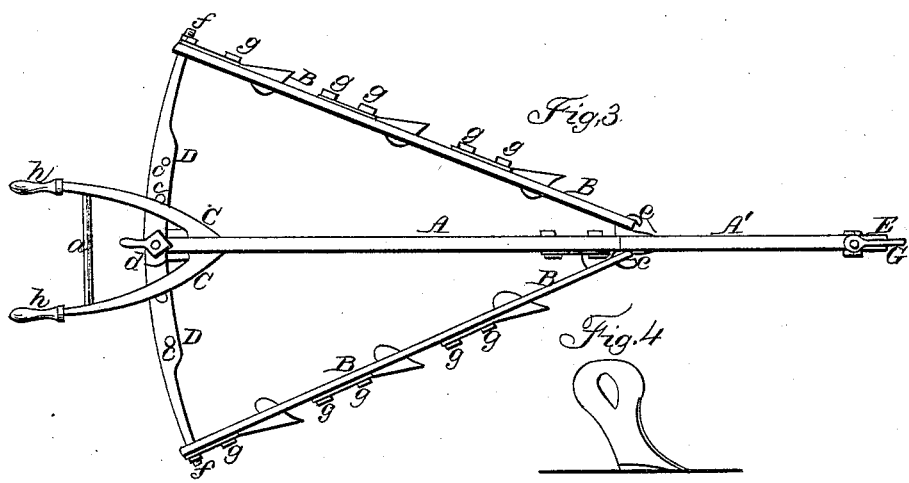
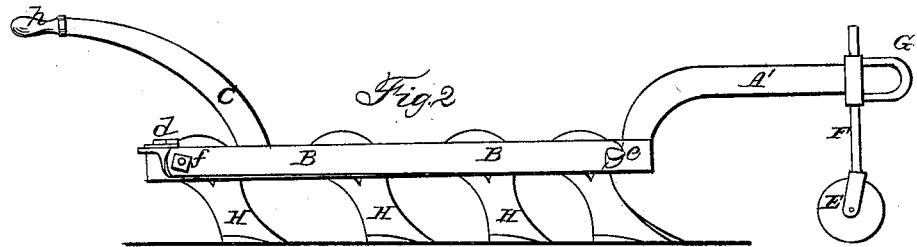

THOMAS KINGHORN AND ROBERT KINGHORN, OF MORGAN, OHIO.

IMPROVEMENT IN CULTIVATORS.

Specification forming part of Letters Patent No. 28,870, dated June 26, 1860.

*To all whom it may concern:*

Be it known that we, THOMAS KINGHORN and ROBERT KINGHORN, both of Morgan, Ashtabula county, and State of Ohio, have invented a new and useful Improvement in Cultivators; and we do hereby declare that the following is a full, clear, and exact description thereof, reference being had to the accompanying drawings, which form a part of this specification, and in which—

Figure 1 represents a plan or top view of the machine with the teeth arranged to turn the earth out. Fig. 2 represents a side view of the same, looking in the direction of arrow 1, Fig. 1. Fig. 3 represents a top or plan view with the teeth arranged to turn the earth inward; and Fig. 4 represents a side view of one of the teeth detached, as arranged in Fig. 1.

A in the drawings represents the central draft-beam, the front end of which is curved up, as at A', and is supported at its front end by a caster wheel, E, whose standard F passes up through clevis G and the end of the draft-beam A'. The clevis is fastened to the standard F by a set-screw, whereby the end A' can be sustained on wheel E at any desired height, while the clevis and wheel E can freely turn to follow in the direction of the team, although the team turns abruptly. The teeth H are formed in this instance from plates of steel, the blank tooth being stamped out, and then one end bent up to form the share. The teeth can be made of cast-iron, however. Said teeth H are fastened to removable side pieces, B B, by bolts $g$. The front ends of these pieces are hooked on the hooks $e\ e$, which are attached to the beam A or to a hook-piece fastened to the same, as shown in the drawings, while the rear ends of the pieces B are extended and slipped over the ends of pieces D and there held by nuts $f f$.

The pieces D D are provided with a series of holes, $c\ c$, so that the rear ends of the pieces B can be adjusted to run at different distances from the center beam, A, and there held by nut $d$.

The attendant guides the machine by taking hold of the handles $h\ h$ on the ends of arms C C, which rise up from the rear of the beam A and are united by cross-pieces $a$.

It is often desirable in cultivating young plants to run the teeth close to the rows, so as to cut up the weeds, and also to stir and lighten up the soil around the roots of the young plants. To do this effectually, and at the same time to have sufficient earth left to protect the roots of the plants, requires a peculiarly-constructed machine. For this purpose our machine is especially adapted, since the teeth, when arranged as shown in Fig. 3, can be run close up to the plants, while the earth is turned away from them or in toward the center, after which the pieces B B, with their teeth all connected, can be changed very quickly, so as to occupy the position shown in Fig. 1, when the earth will be turned outward toward the plants. Thus it will be seen that our machine is so constructed that the side pieces, B B, can be changed from side to side by simply taking off the nuts $f f$ and unhooking them from hooks $e\ e$, whereby the action of the teeth is reversed.

By the use of the caster-wheel E and adjusting standard F the teeth can be made to work at any desired depth, while in turning there is no danger of the machine canting over, since it is guided by the caster-wheel.

Teeth may be attached to the central beam, A, if preferred. We find one of good service.

Having described our improved cultivator, what we claim, and desire to secure by Letters Patent, is—

The combination of the adjustable side pieces, B B, with their teeth H, and adjusting rear supports, D D, with the central beam, A, hooks $e\ e$, and caster-wheel E, arranged to operate in relation to each other substantially as and for the purposes set forth.

THOMAS KINGHORN.
ROBERT KINGHORN.

Witnesses:
ED. A. WRIGHT,
E. H. BROOKS.